United States Patent
Kobayashi et al.

(10) Patent No.: US 9,811,378 B1
(45) Date of Patent: Nov. 7, 2017

(54) INFORMATION PROCESSING DEVICE, COMPLEX EVENT PROCESSING METHOD, AND COMPUTER READABLE STORAGE MEDIUM

(71) Applicant: FUJITSU LIMITED, Kawasaki-shi, Kanagawa (JP)

(72) Inventors: Kenji Kobayashi, Kawasaki (JP); Masazumi Matsubara, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/497,564

(22) Filed: Apr. 26, 2017

(30) Foreign Application Priority Data

Apr. 27, 2016 (JP) .................. 2016-089486

(51) Int. Cl.
G06F 9/48 (2006.01)
G06F 9/50 (2006.01)

(52) U.S. Cl.
CPC .......... G06F 9/4881 (2013.01); G06F 9/5027 (2013.01)

(58) Field of Classification Search
CPC .................................................. G06F 9/4881
See application file for complete search history.

(56) References Cited

U.S. PATENT DOCUMENTS 9,680,919 B2 * 6/2017 McDaid .................. H04L 67/10
2011/0145828 A1 6/2011 Takahashi et al.
2013/0132560 A1 * 5/2013 Hudzia ................. H04L 47/283
709/224
2014/0025700 A1 * 1/2014 Schoning .......... G06F 17/30516
707/760
2016/0246656 A1 8/2016 Kobayashi et al.

FOREIGN PATENT DOCUMENTS

| JP | 2009-87190 | 4/2009 |
|----|------------|--------|
| JP | 2011-128818 | 6/2011 |
| JP | 2015-28679 | 2/2015 |
| WO | 2015/071978 | 5/2015 |

* cited by examiner

*Primary Examiner* — Charlie Sun
(74) *Attorney, Agent, or Firm* — Fujitsu Patent Center

(57) ABSTRACT

A computer-implemented method for complex event processing among a plurality of servers, the plurality of servers processing, in parallel, a complex event, the method including: receiving a plurality of input events to the plurality of servers, the plurality of servers having a plurality of parallelization window lengths specifying an allocation amount available to receive input events, and processing the plurality of input events, the processing includes obtaining a state of each of the plurality of servers when a processing server of the plurality of servers has received a number of input events corresponding to a parallelization window length of the processing server, the state indicating a window length remainder of each of the plurality of servers, calculating a whole window length remainder based on the states, and updating the parallelization window length of at least one the plurality of servers based on the whole window length remainder.

14 Claims, 18 Drawing Sheets

FIG. 7

| KEY VALUE | IP ADDRESS |
|---|---|
| ... | 192.168.0.1 |
| ... | 192.168.0.2 |
| ... | 192.168.0.3 |
| ⋮ | ⋮ |

WINDOW MANAGEMENT TABLE 22(122)

| WINDOW ID | WINDOW NAME | WHOLE WINDOW LENGTH | MINIMUM WINDOW LENGTH REMAINDER | TOTAL NUMBER OF INPUT EVENTS | PARALLELIZATION NUMBER |
|---|---|---|---|---|---|
| 0 | TemperatureLengthWindow | 1000 | 50 | 701 | 2 |
| 1 | HumidityLengthWindow | 2000 | 60 | 1850 | 2 |
| 2 | PowerLengthWindow | 1500 | 80 | 967 | 3 |
| ... | | | | | |

PARALLELIZATION WINDOW MANAGEMENT TABLE 23(123)

| WINDOW ID | PARALLELIZATION WINDOW ID | PARALLELIZATION WINDOW LENGTH | NUMBER OF INPUT EVENTS | PROCESSING SERVER ID |
|---|---|---|---|---|
| 0 | 0 | 500 | 325 | 192.168.0.1 |
| 0 | 1 | 500 | 456 | 192.168.0.2 |
| 1 | 2 | 920 | 854 | 192.168.0.1 |
| 1 | 3 | 1080 | 1026 | 192.168.0.2 |
| 2 | 4 | 730 | 402 | 192.168.0.3 |
| ... | | | | ... |

INFORMATION PROCESSING DEVICE, COMPLEX EVENT PROCESSING METHOD, AND COMPUTER READABLE STORAGE MEDIUM

CROSS-REFERENCE TO RELATED APPLICATION

This application is based upon and claims the benefit of priority of the prior Japanese Patent Application No. 2016-089486, filed on Apr. 27, 2016, the entire contents of which are incorporated herein by reference.

FIELD

The embodiments discussed herein are related to a complex event processing program, an information processing device, an information processing system, and a complex event processing method.

BACKGROUND

As a technology by which events that continuously occur in various devices such as home electronics, furniture, and a smart terminal are processed at high speed, there exists complex event processing (CEP).

As typical processing of the CEP, for example, there is processing in which input events are counted together for each specific time period or each group having the specific number of input events such as the number of accesses in "one hour portion" and an average purchase price of "100 persons portion" in addition to filter processing and combining processing. An area (window) that stores input events for the specific time period is referred to as a "time window", and an area that stores the specific number of input events is referred to as a "length window". That is, the "time window" is a window the size of which is defined by specification of time, and the "length window" is a window the size of which is defied by specification of the number of events.

Due to recent large amount of data, in view of securing data processing in real time, parallel distribution of the CEP is desired, and parallel distributed-type complex event processing starts to be newly proposed.

Examples of related arts are Japanese Laid-open Patent Publication No. 2011-128818, Japanese Laid-open Patent Publication No. 2009-87190, Japanese Laid-open Patent Publication No. 2015-28679, and International Publication Pamphlet No. WO 201571978.

SUMMARY

According to an aspect of the invention, a computer-implemented method for complex event processing among a plurality of servers, the plurality of servers processing, in parallel, a complex event, the method includes receiving a plurality of input events to the plurality of servers, the plurality of servers having a plurality of parallelization window lengths specifying an allocation amount available to receive input events, and processing the plurality of input events, the processing includes obtaining a state of each of the plurality of servers when a processing server of the plurality of servers has received a number of input events corresponding to a parallelization window length of the processing server, the state indicating a window length remainder of each of the plurality of servers, calculating a whole window length remainder based on the states, and updating the parallelization window length of at least one the plurality of servers based on the whole window length remainder.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating a configuration example of a routing table;

FIG. 8 is a diagram illustrating configuration examples of a window management table and a parallelization window management table;

DESCRIPTION OF EMBODIMENTS

However, when a window (length window) by specification of the number of events is used, it is difficult to achieve the parallel distributed-type complex event processing.

That is, in the case of the parallel distributed-type complex event processing, each of a plurality of computers to which the complex event processing is parallel-distributed receives events individually. Therefore, each of the computers merely counts the number of events received in the computer, so that it is difficult to grasp the total number of events received in the whole system.

As a result, it becomes difficult to match execution timing of the complex event processing such as the count processing with timing corresponding to the total number of events. That is, the execution timing of the complex event processing such as the count processing is shifted behind the timing at which the total number of events reaches a specific number.

Therefore, an object of an embodiment is to reduce a shift of execution timing of complex event processing executed each time the specific number of events are input for timing at which the total number of events reaches the specific number when the complex event processing is parallel-distributed.

Figure 1:
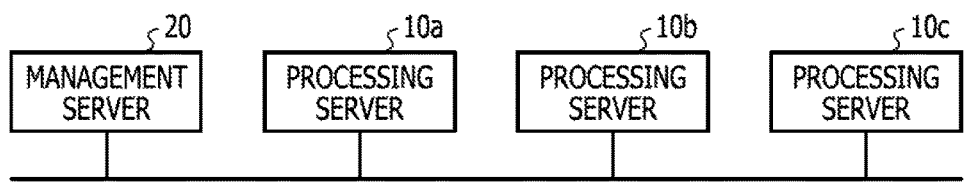
FIG. 1 is a diagram illustrating a configuration example of an information processing system according to an embodiment.

Embodiments of the technology discussed herein are described below with reference to drawings. FIG. 1 is a diagram illustrating a configuration example of an information processing system according to an embodiment. In FIG. 1, an information processing system 1 includes a management server 20 and three processing servers 10 such as processing servers 10a, 10b, and 10c. However, the processing server 10 may be two, or four or more. When the processing servers 10 are not distinguished, the processing server is simply referred to as a processing server 10.

The management server 20 is one or more computers each of which manages the processing servers 10.

The processing servers 10 are computers to which complex event processing (CEP) is parallel-distributed. In the complex event processing, firing timing of the processing, that is, timing at which execution of the processing starts is specified by a time period or the number of events, but in the embodiment, the firing timing of the processing is specified based on the number of events. Specifically, the firing timing is determined based on "length window" that is an area that stores the specific number of events. Hereinafter, the specific number is referred to as the whole window length. The whole window length is a parameter for the whole information processing system 1. For example, when the whole window length is 10, the complex event processing is executed each time 10 events are input in the whole information processing system 1.

However, to each of the processing servers 10, events are input individually. In addition, the number of inputs of events to each of the processing servers 10 may not be equal. For example, the events are distributed between the processing servers 10 by key distribution. In this case, imbalance occurs in the number of input events to each of the processing servers 10. In the key distribution, processing in which events are collected for each value of a specific key (id) such as "group by id" in structured query language (SQL) is distributed for the key value.

Thus, it is difficult for each of the processing servers 10 to know the number of input events in the whole information processing system 1 merely by the number of input events for the processing server 10. Therefore, the inventors have studied and found that timing at which the number of input events reaches the whole window length becomes unclear, and the accuracy of execution timing of the complex event processing is reduced.

In order to solve such a problem, the inventors discuss that the processing servers 10 shares the number of events input in the whole information processing system 1 when synchronization is performed between the processing servers 10 each time an event is input to each of the processing servers 10.

However, in this case, it becomes clear that the accuracy of firing timing is secured, but the processing cost desired for the synchronization becomes high, and the performance is reduced.

In addition, when the frequency of the synchronization is reduced in order to reduce the synchronization cost, it becomes clear that the accuracy of the firing timing is reduced.

Figure 2:
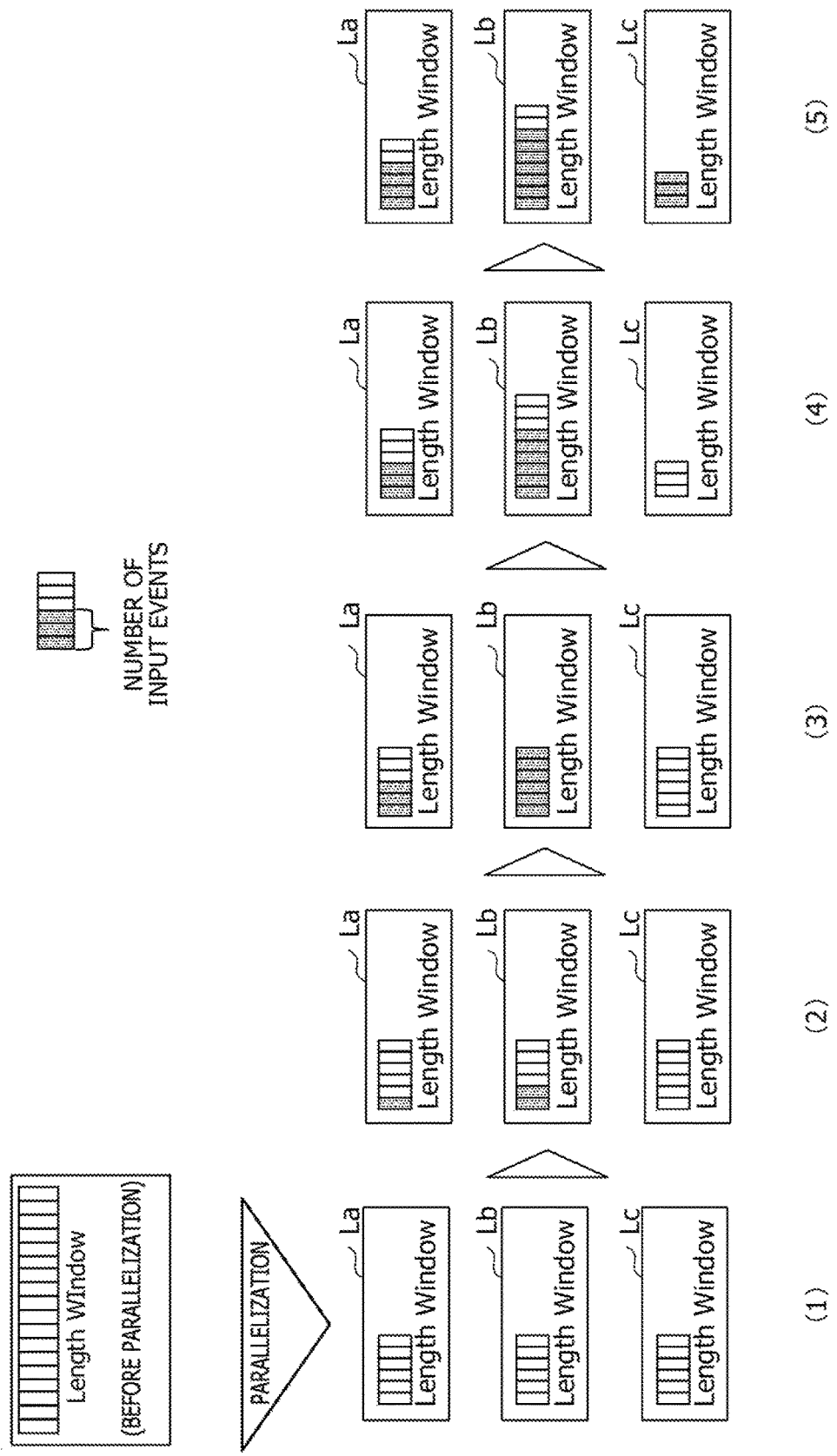
FIG. 2 is a diagram illustrating the outline of the embodiment.

Therefore, the inventors have devised the method illustrated in FIG. 2. FIG. 2 is a diagram illustrating the outline of the embodiment. In FIG. 2, (1) to (5) are illustrated in chronological order.

In "(1)", parallelization of "length window" for the information processing system 1 is performed for the three processing servers 10 through the management server 20. That is, the whole window length is distributed between the three processing servers 10 through the management server 20. The allocation amount to each of the processing servers 10 may be the same or different. Hereinafter, each of parallelized "length windows" is referred to as "parallelization window". In addition, each of the allocation amounts (that is, the length (sizes) of each of the parallelization windows) is referred to as "parallelization window length". The parallelization window length is set to each of the processing servers 10. In FIG. 2, parallelization window lengths La, Lb, and Lc are parallelization window lengths for the processing servers 10a, 10b, and 10c, respectively.

(2) illustrates the state in which an event starts to be input to each of the processing servers 10. In "(2)", even in any one of the processing servers 10, the parallelization window length has room for the number of input events.

(3) illustrates the state in which the number of input events already reaches a specific range for the parallelization window length in the processing server 10b. Here, an example is described in which the specific range is the same as the parallelization window length. However, the specific range may also be a value indicating the state in which the number of input events is likely to reach the parallelization window length. Specifically, the number of inputs in which (parallelization window length–the number of input events) is a threshold value or less may be the number of inputs within the specific range. In the state of (3), the processing server 10b performs synchronization for the number of input events with the other processing servers 10. Specifically, the processing server 10b inquires about the number of input events for each of the processing servers 10a and 10c and calculates the total number of inputs of events (the number of input events) in the three processing servers 10 (hereinafter referred to as "the total number of input events"). When the total number of input events is less than the whole window length, the flow proceeds to the state of (4).

In "(4)", the parallelization window length of each of the processing servers 10 is updated (reset), based on a difference between the total number of input events and the whole window length ("the whole window length–the total number of input events" (hereinafter referred to as "the whole window length remainder"). For example, the update is performed so that "parallelization window length–the number of input events" in each of the processing servers 10 after the update (hereinafter referred to as "parallelization window length remainder") becomes substantially even.

(5) illustrates the state in which the number of input events already reaches the specific range for the parallelization window length in the processing server 10c. In this case, the synchronization and the update of the parallelization window length are performed again.

When the above-described processing is executed, the parallelization window length remainders are reduced gradually, so that the frequency of the synchronization increases gradually. That is, in the embodiment, in the state in which the whole window length has room for the number of input events, the synchronization is not performed, and as a difference between the whole window length and the number of input events becomes smaller, the synchronization frequency increases. As a result, the accuracy of the firing timing may be secured while the frequency of the synchronization is reduced.

Here, even when the synchronization is performed between the processing servers 10, events are input to each of the processing servers 10 continuously. Therefore, there is a possibility in which the total number of input events exceeds the whole window length during the synchronization. When the total number of input events exceeds the whole window length, the firing timing is delayed.

Figure 3:
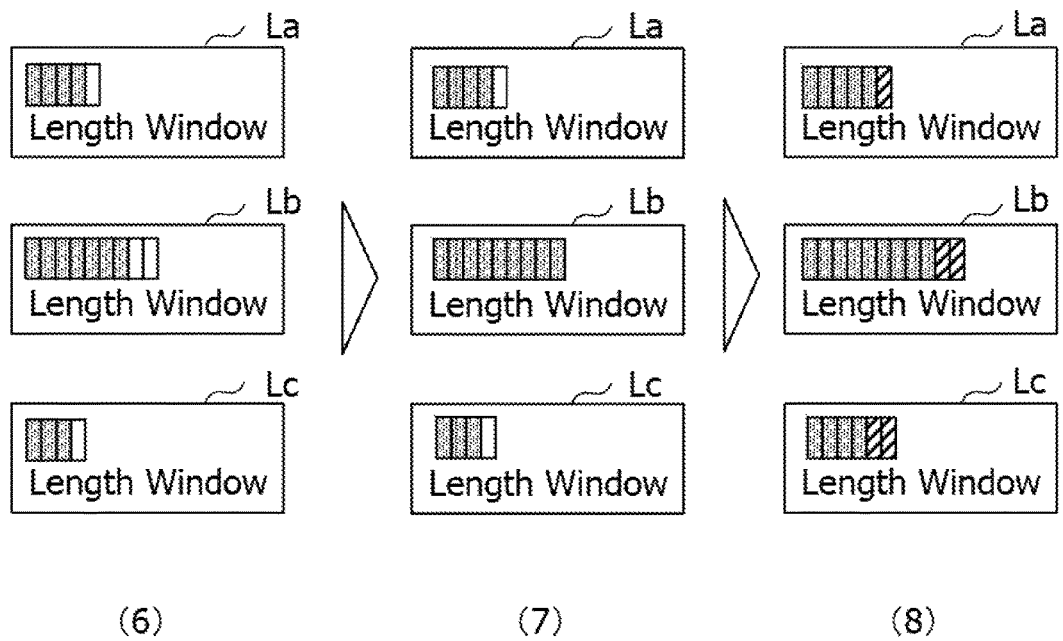
FIG. 3 is a diagram illustrating a state in which the total number of input events exceeds the whole window length during synchronization.

FIG. 3 is a diagram illustrating a state in which the total number of input events exceeds the whole window length during the synchronization. FIG. 3 illustrates the states of (6) to (8) following the state of (5) in FIG. 2.

(6) illustrates the state in which the parallelization window lengths are updated based on the absence of the parallelization window length remainder of the processing server 10c in the state of (5).

(7) illustrates the state in which there is no parallelization window length remainder of the processing server 10b after the update.

(8) illustrates the state in which the total number of input events already exceeds the whole window length during the synchronization in accordance with the state of (7).

In this case, in the embodiment, the whole window length remainder at the timing (7) at which the synchronization is performed last in the state in which there is a remainder in the whole window length ("2" in FIG. 3) is stored. The whole window length remainder is referred to as "minimum window length remainder". The counting of the number of input events for the next firing is centralized, for example, at the processing server 10a at timing at which the whole window length remainder falls below the minimum window length remainder. Therefore, delay of the firing timing may be avoided. The centralized counting of the number of events is referred to as "centralized counting". In addition, the parallelized counting of the number of events is referred to as "parallelized counting".

Figure 4:
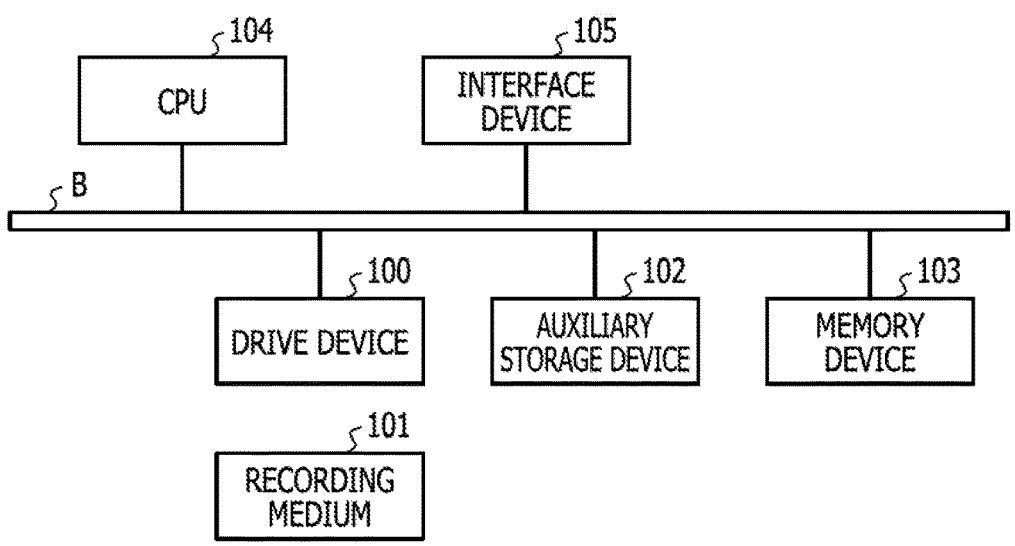
FIG. 4 is a diagram illustrating a hardware configuration example of a processing server according to the embodiment.

FIG. 4 is a diagram illustrating a hardware configuration example of the processing server according to the embodiment. The processing server 10 in FIG. 4 includes a drive device 100, an auxiliary storage device 102, a memory device 103, a central processing unit (CPU) 104, and an interface device 105 that are coupled to each other through a bus B.

A program that achieves the processing in the processing server 10 is provided through a recording medium 101. When the recording medium 101 in which the program is recorded is set to the drive device 100, the program is installed from the recording medium 101 to the auxiliary storage device 102 through the drive device 100. However, the installation of the program may not be performed through the recording medium 101, and may be performed so that the program is downloaded by a further computer through a network. The auxiliary storage device 102 stores the installed program and also stores a desired file, data, and the like.

When a start instruction of the program is issued, the memory device 103 reads the program from the auxiliary storage device 102 and stores the program. The CPU 104 executes a function related to the processing server 10 in accordance with the program stored in the memory device 103. The interface device 105 is used as an interface that performs connection with the network.

Figure 5:
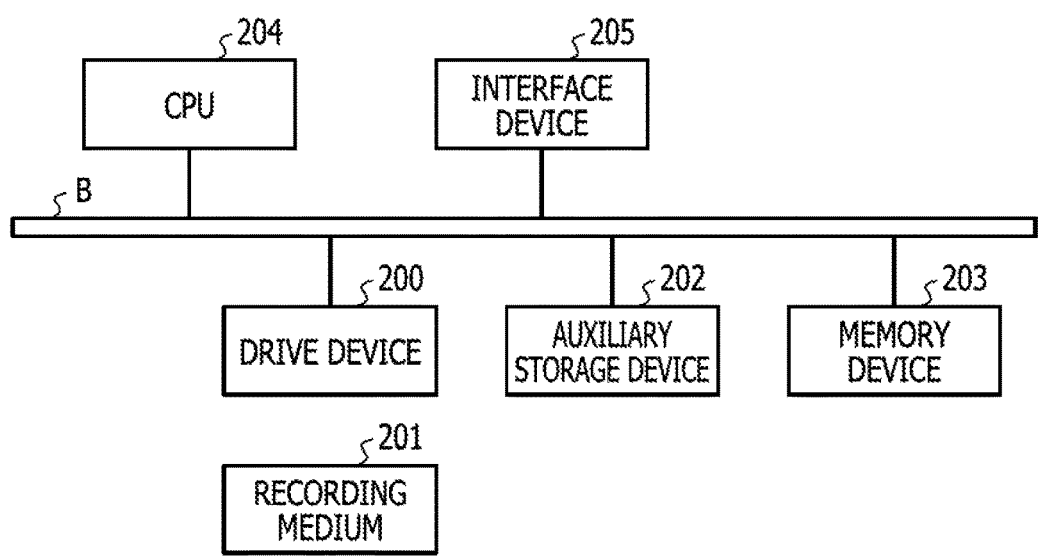
FIG. 5 is a diagram illustrating a hardware configuration example of a management server according to the embodiment.

As an example of the recording medium 101, there is a portable recording medium such as a compact disc-read-only memory (CD-ROM), a digital versatile disc (DVD), or a USB memory. In addition, as an example of the auxiliary storage device 102, there is a hard disk drive (HDD), a flash memory, or the like. Any one of the recording medium 101 and the auxiliary storage device 102 corresponds to a computer-readable recording medium. FIG. 5 is a diagram illustrating a hardware configuration example of the management server according to the embodiment. The management server 20 of FIG. 5 includes a drive device 200, an auxiliary storage device 202, a memory device 203, a CPU 204, and an interface device 205 that are coupled to each other through a bus B.

A program that achieves the processing in the management server 20 is provided through a recording medium 201. When the recording medium 201 in which the program is recorded is set to the drive device 200, the program is installed from the recording medium 201 to the auxiliary storage device 202 through the drive device 200. However, the installation of the program may not be performed through the recording medium 201, and may be performed so that the program is downloaded by a further computer through a network. The auxiliary storage device 202 stores the installed program and also stores a desired file, data, and the like.

When there is a start instruction of the program, the memory device 203 reads the program from the auxiliary storage device 202 and stores the program. The CPU 204 executes a function related to the management server 20 in accordance with the program stored in the memory device 203. The interface device 205 is used as an interface that performs connection with the network.

As an example of the recording medium 201, there is a portable recording medium such as a CD-ROM, a DVD, or a USB memory. In addition, as an example of the auxiliary storage device 202, there is an HDD, a flash memory, or the like. Any one of the recording medium 201 and the auxiliary storage device 202 corresponds to a computer-readable recording medium.

Figure 6:
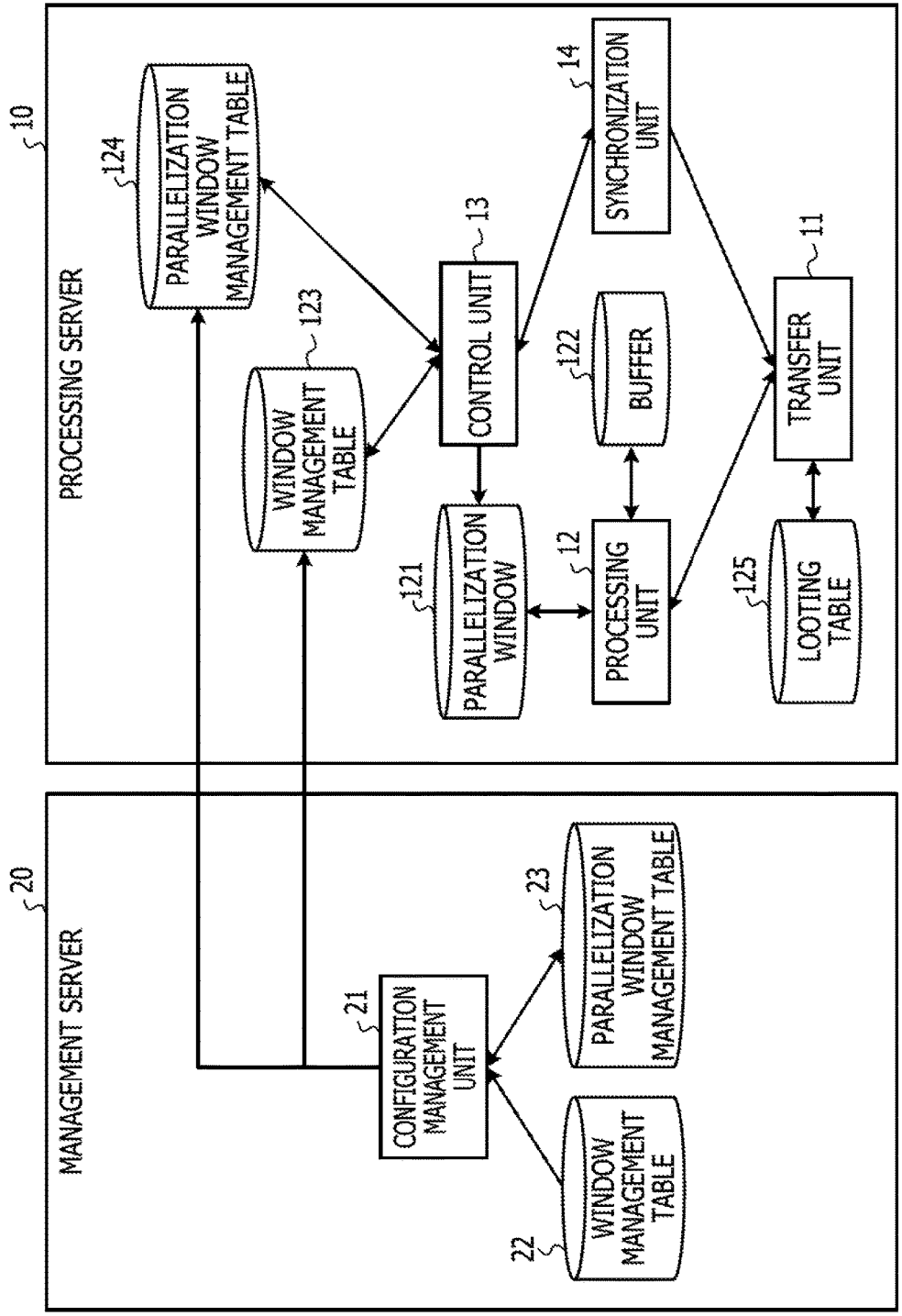
FIG. 6 is a diagram illustrating a functional configuration example of the processing server according to the embodiment.

FIG. 6 is a diagram illustrating a functional configuration example of the processing server according to the embodiment. In FIG. 6, the management server 20 includes a configuration management unit 21. At the initial execution stage of the processing, each of the processing servers 10 does not know a group of the other processing servers 10 that constitute the information processing system 1. In addition, at the initial execution stage of the processing, each of the processing servers 10 does not include a window management table 123 and a parallelization window management table 124. The management server 20 undertakes a role to cause each of the processing servers 10 to recognize the other processing servers 10 and deploy the window management table 123 and the parallelization window management table 124 to the processing server 10.

The configuration management unit 21 is achieved by processing that one or more programs installed in the management server 20 cause the CPU 204 of the management server 20 to execute. The management server 20 further includes a window management table 22 and a parallelization window management table 23. Each of the tables may be achieved, for example, using the memory device 203, the auxiliary storage device 202, or the like of the management server 20.

In the window management table 22, pieces of information of each window used in the information processing system 1 are stored. That is, the window used in the information processing system 1 may not be single. In the parallelization window management table 23, pieces of information of a parallelization window 121 for each of the windows are stored.

The configuration management unit 21 may recognize identification information on the processing server 10 coupled to the management server 20, and generates a parallelization window management table 23 from the window management table 22 based on the recognition result. The configuration management unit 21 deploys (copies) the generated window management table 22 and parallelization window management table 23 to each of the processing servers 10.

FIG. 8 is a diagram illustrating configuration examples of the window management table and the parallelization window management table. In FIG. 8, the window management table 22 stores a window ID, a window name, the whole window length, the minimum window length remainder, the total number of input events, a parallelization number, and the like, for each of the windows.

The window ID is an identification number for each of the windows. The window is defined for each unit of the complex event processing. The window name is a name assigned to the window. The parallelization number is a value indicating the number of parallelization windows into which the window is parallelized (divided). The other items are as described above.

In addition, the parallelization window management table 23 stores a window ID, a parallelization window ID, a parallelization window length, the number of input events, a processing server ID, and the like, for each of the parallelization windows.

The window ID is a window ID of the window to which the parallelization window belongs. The parallelization window ID is identification information used to identify a parallelization window having a common window ID. The processing server ID is identification information (IP address) on a processing server 10 that is a distribution destination of the parallelization window.

In addition, the processing server 10 includes a transfer unit 11, a processing unit 12, a control unit 13, and a synchronization unit 14. Each of the units is achieved by processing that one or more programs installed into the processing server 10 cause the CPU 104 to execute. The processing server 10 further includes the parallelization window 121, a buffer 122, the window management table 123, the parallelization window management table 124, and a routing table 125. The parallelization window 121, the buffer 122, the window management table 123, the parallelization window management table 124, the routing table 125, and the like, may be achieved, for example, using the memory device 103 and the like.

The transfer unit 11 transfers, to the processing unit 12, an event input from a further processing server 10 or an event input from the outside of the information processing system 1, based on the routing table 125. The transfer unit 11 transfers a result obtained from the processing unit 12 to the further processing server 10 or the outside of the information processing system 1. In addition, the transfer unit 11 rewrites the routing table 125 so that corresponding events are collected in a specific processing server 10 when switching to centralized counting is performed.

FIG. 7 is a diagram illustrating a configuration example of the routing table. As illustrated in FIG. 7, for example, an IP address of the processing server 10 that is an input destination of an event is stored in the routing table 125 so as to be associated with a key value of the event. That is, each of the processing servers 10 may not receive merely an event desired for the processing server (event that is an input target to the processing server), and may receive an event desired for a further processing server 10. The transfer unit 11 of the processing server 10 that already receives an event desired for a further processing server 10 transfers the event to the further processing server 10, based on the routing table 125.

The processing unit 12 applies the event that transferred from the transfer unit 11, to the parallelization window 121. The parallelization window 121 functions as a box used to store the number of events distributed to the processing server 10. The event includes, for example, items such as a time, an event name, and a key value. However, the time may not be included in the event. For example, the processing unit 12 may apply the time to the event, and apply the event to the parallelization window 121. When firing timing arrives, the processing unit 12 executes the event complex processing for an event group applied to the parallelization window 121 until that time. However, the processing unit 12 applies, to the buffer 122, events input during synchronization with the other processing servers 10.

The control unit 13 performs parallelization window length decision, arbitration determination, firing determination, synchronization scheme switching determination, and the like in each of the processing servers 10. The control unit 13 decides a new parallelization window length in synchronization with the other processing servers 10 when the number of input events already reaches a specific range for the parallelization window length. At the time of the decision of the new parallelization window length, the control unit 13 determines whether the whole window length remainder falls below the minimum window length remainder. In addition, the control unit 13 decides the minimum window length remainder. As described above, the minimum window length remainder is the whole window length remainder in which it is predicted that firing timing is delayed when the whole window length remainder falls below the minimum window length remainder.

The synchronization unit 14 performs synchronization of the number of input events and the firing with the other processing servers 10. The synchronization unit 14 notifies the control unit 13 of the number of input events and the parallelization window length obtained from the other processing servers 10 due to the synchronization.

Figure 9:
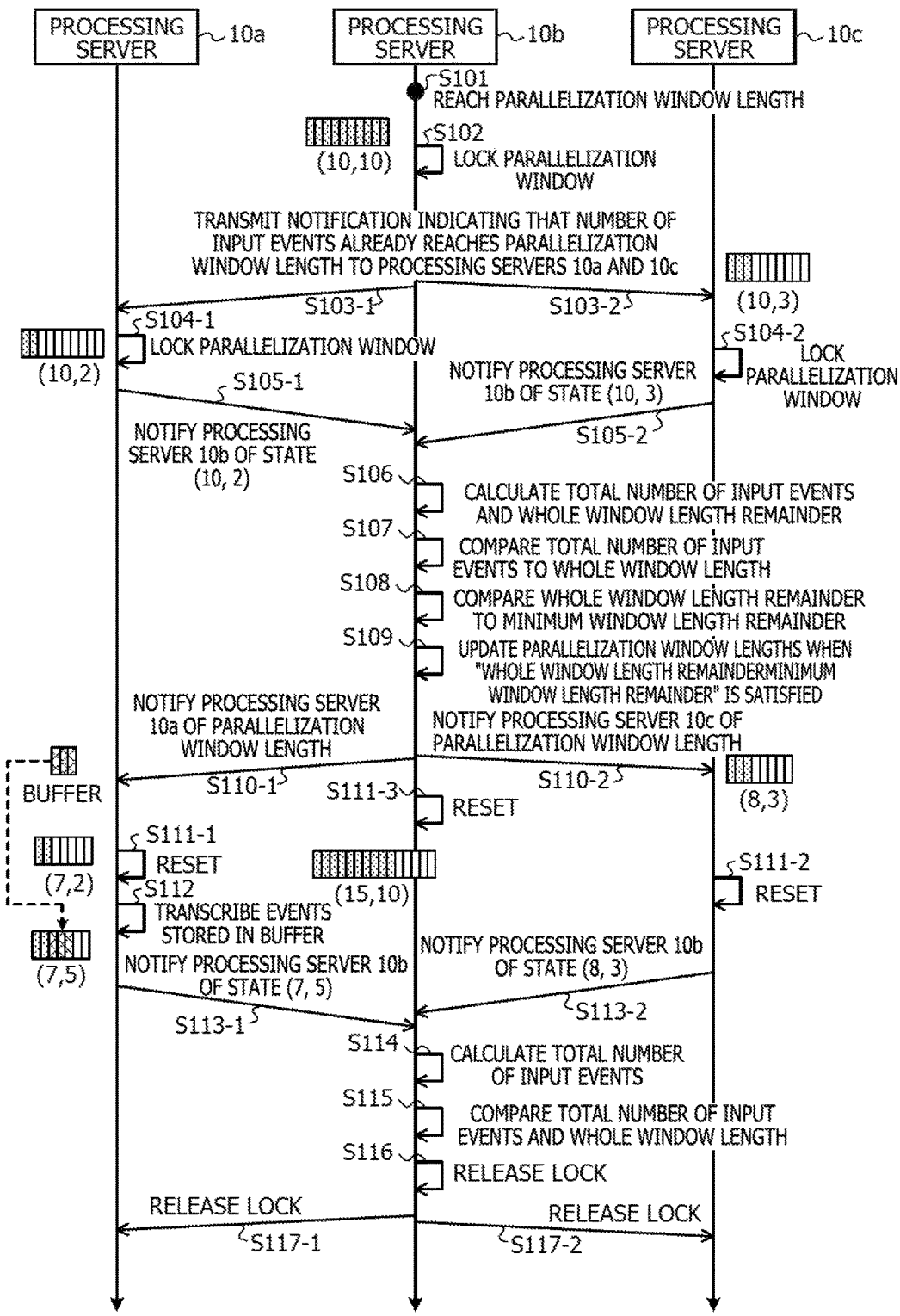
FIG. 9 is a sequence diagram illustrating a first example of a processing procedure at the time of synchronization.

A processing procedure executed in the information processing system 1 is described below. FIG. 9 is a sequence diagram illustrating a first example of a processing procedure at the time of the synchronization. In FIG. 9, it is assumed that the parallelization window length of each of the processing servers 10 is 10. That is, it is assumed that the whole window length is "10+10+10=30". In addition, in the description of FIG. 9 and the subsequent figures, the alphabet (a, b, or c) at the end of the symbol of a specific processing server 10 is assigned to the end of a symbol of each of the configuration elements of the specific processing server 10. In addition, in the following description, it is assumed that an event input to each of the processing servers 10 is an event corresponding to a specific single window ID.

In Step S101, when the number of events (the number of input events) stored in the parallelization window 121b of the processing server 10b reaches the parallelization window length, the control unit 13b locks the parallelization window 121b (S102). An event input to the processing server 10b during the locking of the parallelization window 121b is stored in the buffer 122b. After that, the synchronization unit 14b transmits a notification indicating that the number of input events already reaches the parallelization window length (hereinafter referred to as "reach notification"), to the processing servers 10a and 10c (S103-1 and S103-2).

The control unit 13a of the processing server 10a locks the parallelization window 121a in response to reception of the reach notification, and obtains the number of events (the number of input events) stored in the parallelization window 121a (S104-1). After that, the synchronization unit 14a notifies the processing server 10b of state information including the number of input events and the parallelization window length (S105-1). In FIG. 9, with a format of "(parallelization window length, the number of input events)", the parallelization window length and the number of input events of each of the processing servers 10 are indicated.

In addition, even in the processing server 10c, processing similar to Steps S104-1 and S105-1 is executed (S104-2 and S105-2). The synchronization unit 14b of the processing server 10b receives the parallelization window length and the number of input events of each of the processing servers 10a and 10c. Here, the parallelization window length of the processing server 10a is 10, and the number of input events of the processing server 10a is 2. In addition, the parallelization window length of the processing server 10c is 10, and the number of input events of the processing server 10c is 3.

After that, the control unit 13b calculates the total number of input events and the whole window length remainder (S106). The total number of input events may be obtained by combining the number of input events notified from the processing servers 10a and 10c and the number of input events of the processing server 10b. The whole window length remainder may be obtained by subtracting the total number of input events of the processing servers 10 from the whole window length. At this time, the total number of input events of the processing servers 10 is "2+10+3=15". In addition, the whole window length remainder is "30−15=15".

After that, the control unit 13b compares the total number of input events to the whole window length (S107). That is, it is confirmed that the total number of input events does not reach the whole window length. Here, the total number of input events is 15, and the whole window length is 30, so that the total number of input events does not reach the whole window length.

When the total number of input events does not reach the whole window length, the control unit 13b compares the whole window length remainder to the minimum window length remainder (S108). Here, it is assumed that the whole window length remainder is the minimum window length remainder or more. In this case, the control unit 13b updates the parallelization window length of each of the processing servers 10 (S109). For example, the parallelization window length of each of the processing servers 10 may be updated so that a result obtained by dividing the whole window length remainder equally among three becomes the parallelization window length remainder of each of the processing servers 10. In the example of FIG. 9, the parallelization window length of each of the processing servers 10 is updated so that "(30−15)/3=5" becomes the parallelization window length remainder of each of the processing servers 10. Such a parallelization window length may be calculated by "the number of input events+parallelization window length remainder". Thus, the parallelization window lengths of the processing servers 10a, 10b, and 10c respectively become 7, 15, and 8. The parallelization window length remainders of the processing servers 10 may not become equal.

After that, the synchronization unit 14b notifies the processing servers 10a and 10b of the parallelization window lengths after the update respectively (S110-1 and S110-2). The processing server 10a is notified of "7", and the processing server 10c is notified of "8".

After that, the control unit 13 of each of the processing servers 10 resets the parallelization window length (S111-1, S111-2, and S111-3). As a result, "(parallelization window lengths, parallelization window length remainders)" of the processing servers 10a, 10b, and 10c are respectively (7,2), (15,10), and (8,3).

Here, in the processing server 10a, it is assumed that three events are applied to the buffer 122a during the locking of the parallelization window 121a. That is, it is assumed that three events are input to the processing server 10a from Steps S104-1 to S111-2. In this case, the control unit 13a transcribes the events stored in the buffer 122a into the parallelization window 121a (S112). As a result, "(parallelization window length, parallelization window length remainder)" of the processing server 10a is updated to (7,5).

After that, the synchronization unit 14 of each of the processing servers 10a and 10c each of which already receives the parallelization window length notifies the processing server 10b of state information of the parallelization window 121 after the parallelization window length is reset (S113-1 and S113-2). Here, the processing server 10a notifies the processing server 10b of (7,5), and the processing server 10c notifies the processing server 10b of (8,3).

After that, the control unit 13b of the processing server 10b calculates the total number of input events (S114). After that, the control unit 13b compares the total number of input events to the whole window length (S115). Here, the total number of input events is "5+10+3=18", and is less than the whole window length (30). Thus, it is indicated that the synchronization has been performed successfully.

After that, the control unit 13b releases the lock of the parallelization window 121b (S116). After that, the synchronization unit 14b transmits a request of lock release to each of the processing servers 10a and 10c (S117-1 and S117-2). The control unit 13 of each of the processing servers 10a and 10c releases the lock of the parallelization window 121 in response to the request. When the locking of the parallelization window 121 of each of the processing servers 10 is released, an event input to the processing server 10 is stored in the parallelization window 121 of the processing server.

Figure 10:
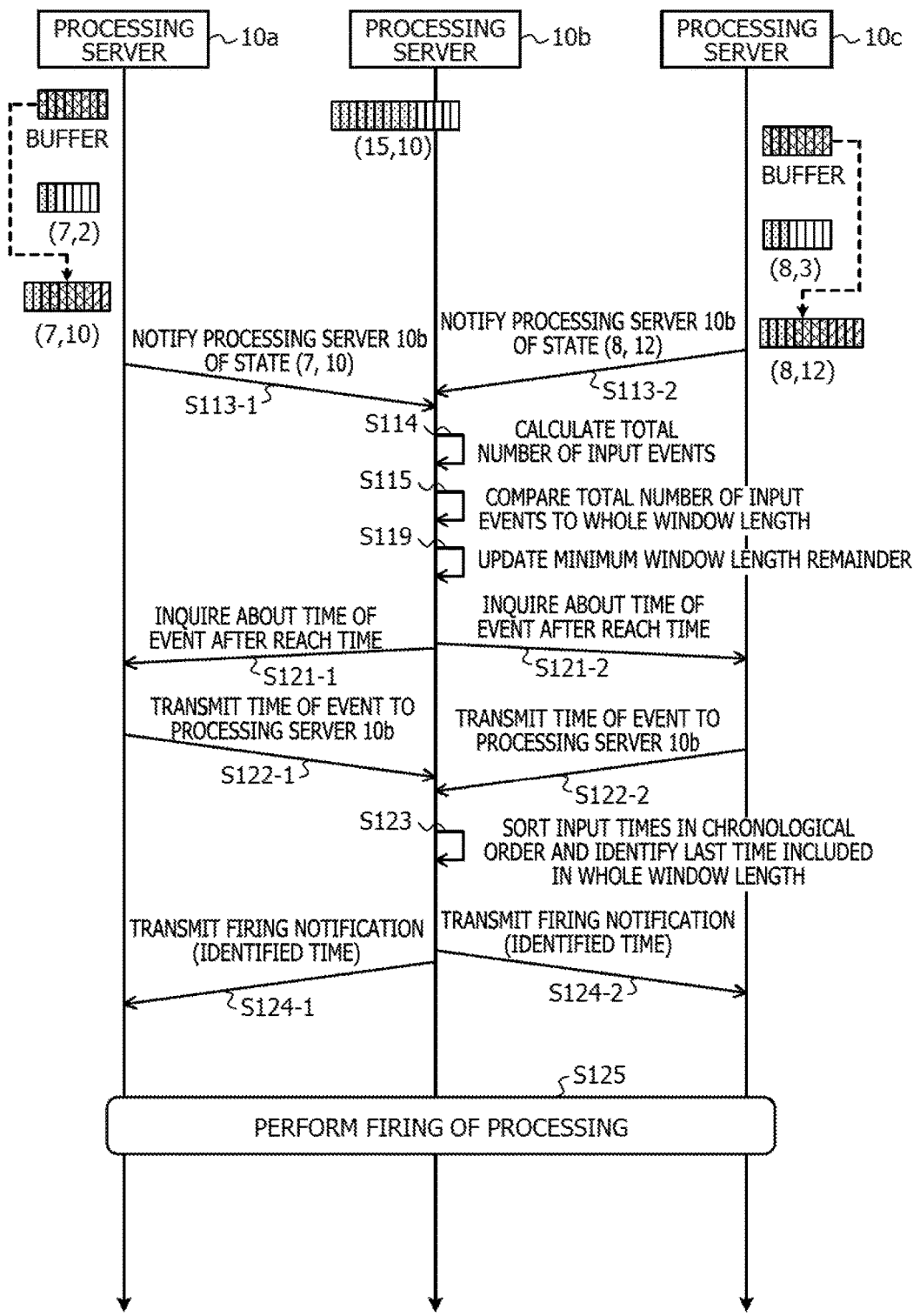
FIG. 10 is a sequence diagram illustrating a second example of the processing procedure at the time of the synchronization.

A case is described below in which the total number of input events already exceeds the whole window length in Step S115. FIG. 10 is a sequence diagram illustrating a second example of the processing procedure at the time of the synchronization. In FIG. 10, the same step number as FIG. 9 is assigned to a step corresponding to FIG. 9, and the description is omitted as appropriate.

In FIG. 10, in Step S113-1, it is assumed that the processing server 10b is notified of (7,10) as the state of the parallelization window 121a of the processing server 10a (parallelization window length, the number of input events). In addition, in Step S113-2, it is assumed that the processing server 10*b* is notified of (8,12) as the state of the parallelization window 121*c* of the processing server 10*c*. In addition, it is assumed that the state of the parallelization window 121*b* of the processing server 10*b* is (15,10).

In this case, in Step S114, a calculation result of the total number of input events becomes "10+12+10=32". Thus, in Step S115, it is detected that the total number of input events already exceeds the whole window length.

In this case, the control unit 13*b* updates the minimum window length remainder by the whole window length remainder at the time of start of the synchronization (that is, the whole window length remainder calculated in Step S106 of FIG. 9) (S119). The minimum window length remainder after the update is stored in the window management table 123 and is referred to in the next Step S108. The content of the window management table 123 may be synchronized with the parallelization window management table 23. However, in the embodiment, the window management table 123 operates even when the content of the window management table 123 is not synchronized with the parallelization window management table 23. Thus, in the embodiment, the synchronization with the parallelization window management table 23 is omitted.

After that, the synchronization unit 14*b* transmits an inquiry request of an input time of each event input to each of the processing servers 10*a* and 10*c* after the reach time, to the processing server (S121-1 and S121-2). Here, the reach time is a time at which the number of input events of the processing server 10*b* already reaches the parallelization window length, in Step S101 of FIG. 9. The reach time is included in the reach time in Steps S103-1 and S103-2.

That is, an input time of each event input after Step S104-1 or S104-2 of FIG. 9 and stored in the buffer 122 becomes an inquiry target. The input time is a time at which the event is input. The inquiry request includes the minimum window length remainder updated in Step S119. This is why the minimum window length remainder is shared between the processing servers 10.

When the control unit 13 of each of the processing servers 10*a* and 10*c* receives the request, the control unit 13 stores the minimum window length remainder included in the request, in the window management table 123 of the processing server. In addition, the control unit 13 of each of the processing servers 10*a* and 10*c* obtains a list of input times of events input after the reach time from among the events stored in the parallelization window 121. In the parallelization window 121, an input time of each of the events is stored so as to be associated with the event. After that, the synchronization unit 14 of each of the processing servers 10*a* and 10*c* transmits the obtained list of the input times to the processing server 10*b* (S122-1 and S122-2).

After that, the control unit 13*b* of the processing server 10*b* sorts the input times of the events input after the reach time from among the events stored in the parallelization window 121*b* of the processing server 10*b* and the input times transmitted from the processing servers 10*a* and 10*c*, in chronological order, and identifies the last time included in the whole window length as a result of the sorting (S123). Here, when it is assumed that the total number of input events at the time of the reach time is 15, the "30−15=15"-th time is identified in the sort order.

After that, the synchronization unit 14*b* transmits a firing notification including the identified time to the processing servers 10*a* and 10*c* (S124-1 and S124-2). After that, the control unit 13 of each of the processing servers 10 executes the complex event processing for events the input times of which are before the time from among the events stored in the parallelization window 121 of the processing server as processing targets (S125).

Figure 11:
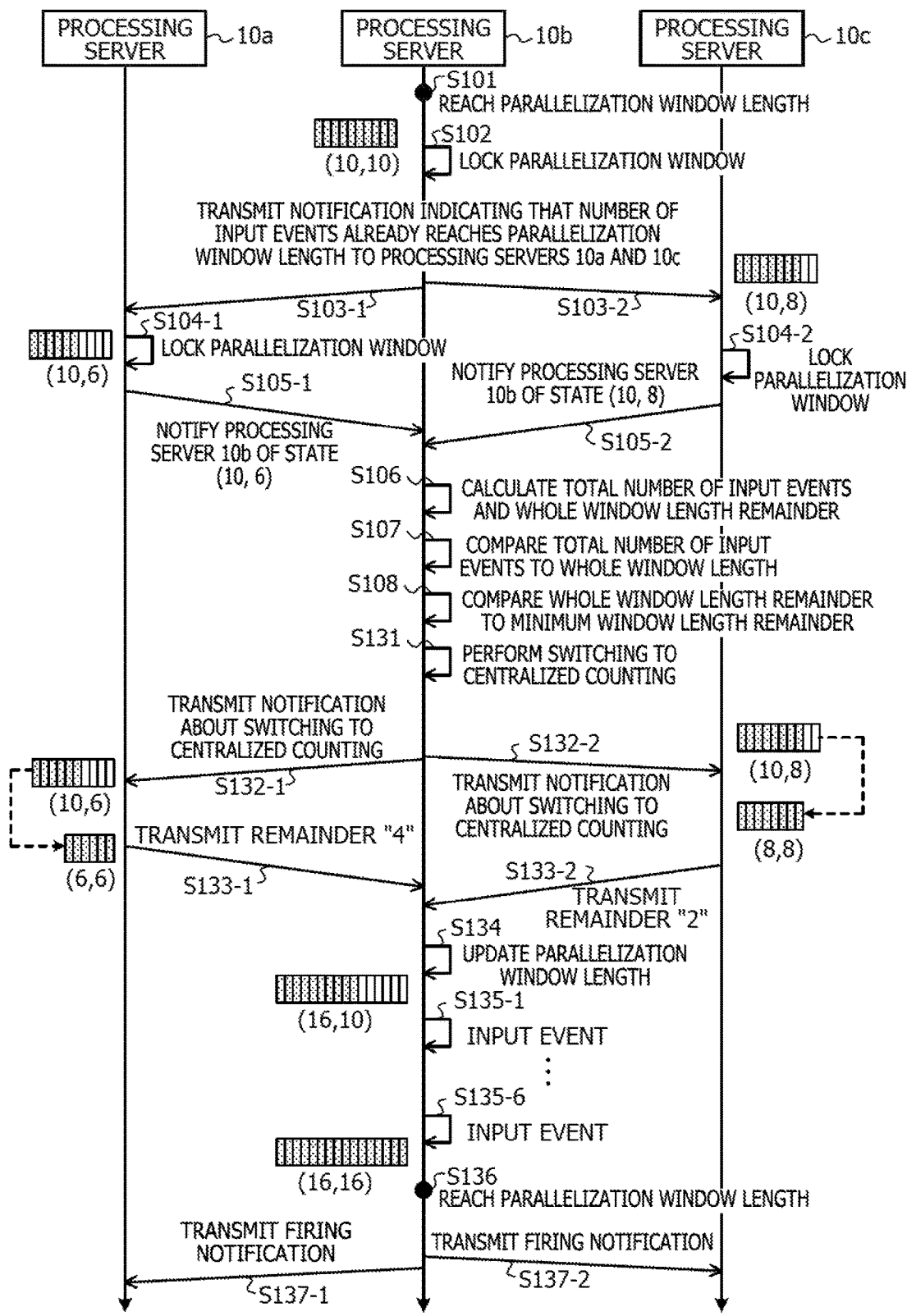
FIG. 11 is a sequence diagram illustrating a third example of the processing procedure at the time of the synchronization.

A case is described below in which the whole window length remainder falls below the minimum window length remainder in Step S108 of FIG. 9. FIG. 11 is a sequence diagram illustrating a third example of the processing procedure at the time of the synchronization. In FIG. 11, the same step number as FIG. 9 is assigned to a step corresponding to FIG. 9, and the description is omitted as appropriate.

In FIG. 11, in Step S105-1, it is assumed that the processing server 10*b* is notified of (10,6) as the state of the parallelization window 121*a* of the processing server 10*a* "(parallelization window length, the number of input events)". In addition, in Step S105-2, it is assumed that the processing server 10*b* is notified of (10,8) as the state of the parallelization window 121*c* of the processing server 10*c*. In addition, it is assumed that the state of the parallelization window 121*b* of the processing server 10*b* is (10,10).

Therefore, in Step S106, the total number of input events is calculated as "6+8+10=24", and the whole window length remainder is calculated as "30−24=6". Thus, in Step S107, it is confirmed that the total number of input events is less than the whole window length.

In addition, in Step S108, when it is assumed that the minimum window length remainder is 15, it is detected that the whole window length remainder falls below the minimum window length remainder.

In this case, the control unit 13*b* determines that the counting scheme of events is switched from parallelized counting to centralized counting (S131). That is, counting of the remaining six events is centralized at the processing server 10*b*. In the routing table 125*b*, the transfer unit 11*b* rewrites a destination of an event destined for the processing server 10*a* or 10*c* as the processing server 10*b*, in accordance with the determination.

After that, the synchronization unit 14*b* transmits a notification about switching to centralized counting, to the processing servers 10*a* and 10*c* (S132-1 and S132-2). When there is an event stored in the buffer 122 of each of the processing servers 10*a* and 10*c*, the control unit 13 of the processing server transcribes the event into the parallelization window 121 of the processing server, in response to the switching notification, and sets the number of events (the number of input events) stored in the parallelization window 121 after the transcription as the parallelization window length of the parallelization window 121 of the processing server. That is, each of the parallelization window length remainders is set at 0. In the example of FIG. 11, it is assumed that the number of events stored in each of the buffers 122 of the processing server is 0. Thus, the parallelization window length of the processing server 10*a* is set at 6, and the parallelization window length of the processing server 10*c* is set at 8. In addition, the transfer unit 11 of each of the processing servers 10*a* and 10*c* rewrites a destination of an event destined for the processing server 10*a* or 10*c* as the processing server 10*b*, in the routing table 125.

After that, the synchronization unit 14 of each of the processing servers 10*a* and 10*c* transmits the parallelization window length remainder before the parallelization window length is changed to the processing server 10*b* (S133-1 and S133-2). That is, the parallelization window length obtained from each of the processing servers 10*a* and 10*c* is transmitted to the processing server 10*b*. Here, "4" is transmitted from the processing server 10*a*, and "2" is transmitted from the processing server 10*c*.

After that, the control unit 13b of the processing server 10b increases the parallelization window length of the parallelization window 121b by a total of the transmitted parallelization window length remainders (S134). In the example of FIG. 11, the parallelization window length is updated to 16.

After that, all events destined for the processing server 10a, 10b, and 10c are input to the processing server 10b (S135-1 to S135-6). As a result, counting of the number of input events is centralized at the processing server 10b. In the course of this process, when the number of input events of the processing server 10b reaches the parallelization window length of the parallelization window 121b (S136), the synchronization unit 14b transmits a firing notification to the processing servers 10a and 10c (S137). As a result, the complex event processing is executed.

In FIG. 11, the example is described above in which the processing server 10b performs centralized counting, but the centralized counting may be performed by a known further method. For example, the centralized counting may be performed by a computer other than the processing servers 10.

Figure 12:
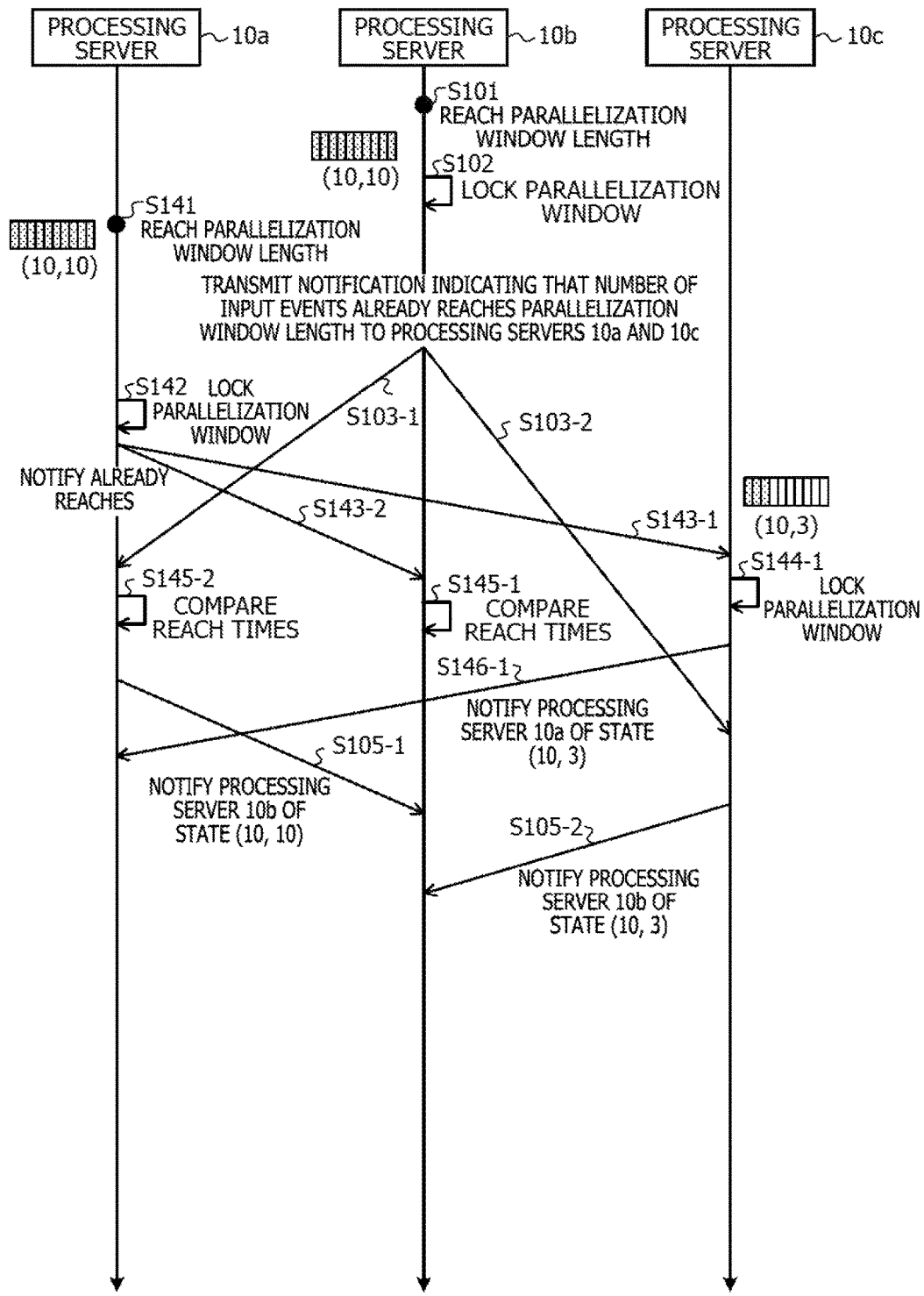
FIG. 12 is a sequence diagram illustrating a fourth example of the processing procedure at the time of the synchronization.

A case is described below in which the number of input events already reaches the parallelization window length in the processing servers 10b and 10a almost at the same time. FIG. 12 is a sequence diagram illustrating a fourth example of the processing procedure at the time of the synchronization. In FIG. 12, the same step number as FIG. 9 is assigned to a step corresponding to FIG. 9, and the description is omitted as appropriate.

In FIG. 12, before the processing server 10a receives a reach notification from the processing server 10b, the number of input events reaches the parallelization window length in the processing server 10a (S141). In this case, the control unit 13a locks the parallelization window 121a (S142), and transmits a reach notification to each of the processing servers 10c and 10b (S143-1 and S143-2). Each of the reach notification from the processing server 10b in Steps S103-1 and S103-2 and the reach notification from the processing server 10a in Steps S143-1 and S143-2 includes the reach time.

The control unit 13c of the processing server 10c locks the parallelization window 121c in response to reception of the reach notification from the processing server 10a, and obtains the number of input events (S144-1). After that, the synchronization unit 14c notifies the processing server 10a of state information including the number of input events and the parallelization window length (S146-1). The processing server 10c also transmits similar state information to a reach notification from the processing server 10b (S105-2).

In addition, after the processing server 10b transmits the reach notification, the control unit 13b of the processing server 10b that already receives a reach notification from the processing server 10a compares the reach time in the processing server 10b and the reach time included in the reach notification from the processing server 10a (S145-1). Similarly, the control unit 13a of the processing server 10a also compares the reach time in the processing server 10a with the reach time included in the reach notification from the processing server 10b (S145-2). Here, it is assumed that the reach time in the processing server 10b is earlier than the reach time in the processing server 10a. In this case, the control unit 13b of the processing server 10b determines that processing server 10b is responsible for the synchronization, and does not transmit state information to the processing server 10a. In addition, the control unit 13a of the processing server 10a determines that the synchronization is left to the processing server 10b. Therefore, the synchronization unit 14a notifies the processing server 10b of state information of the parallelization window 121a (S105-1).

As described above, when the number of input events already reaches the parallelization window length in a plurality of processing servers 10 almost at the same time, arbitration is performed based on the reach time.

A processing procedure is described below that is executed by each of the processing servers 10 in order to achieve the processing procedure described in each of the above sequence diagrams.

Figure 13A:
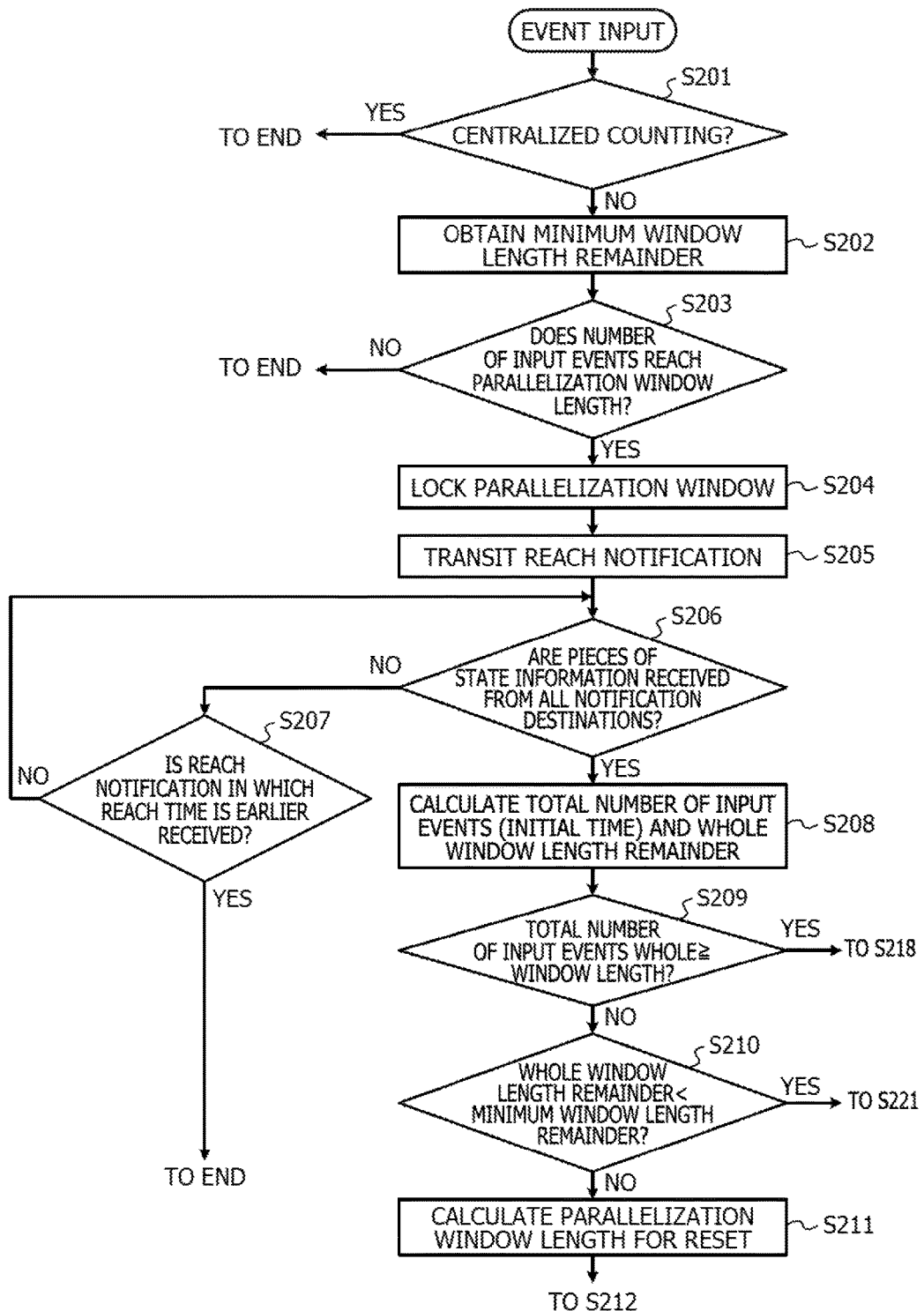
FIGS. 13A and 13B are a flowchart illustrating an example of a processing procedure executed by the processing server in response to input of an event.
Figure 13B:
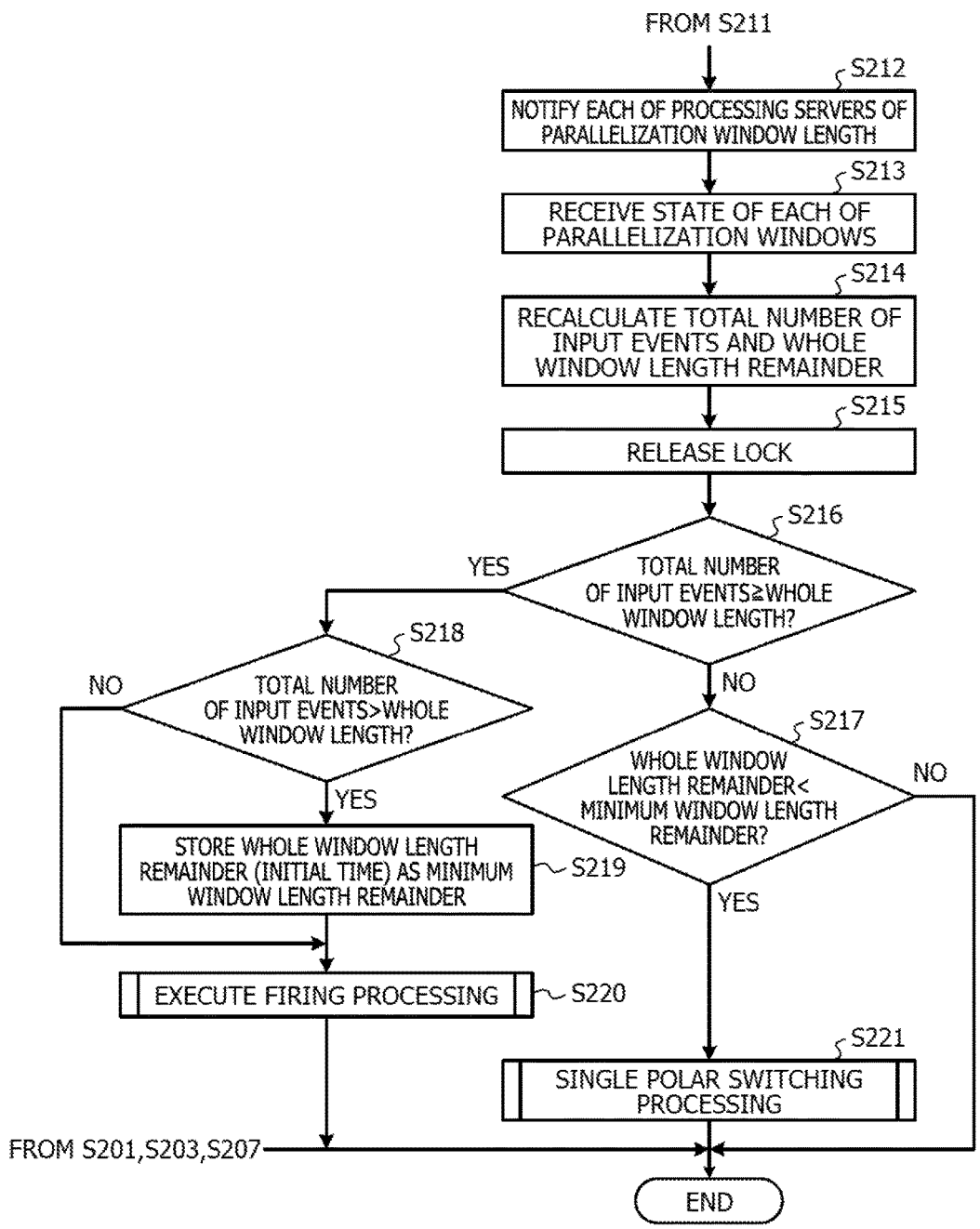

FIGS. 13A and 13B are a flowchart illustrating an example of a processing procedure executed by the processing server in response to input of an event. The processing of FIGS. 13A and 13B are executed each time an event is input. When an event is input to the processing server 10, the event is applied to the parallelization window 121. However, when the parallelization window 121 is locked, the event is applied to the buffer 122.

In Step S201, the control unit 13 determines whether centralized counting is being performed. When centralized counting is being performed (Yes in S201), the processing of FIGS. 13A and 13B end. When the centralized counting is not being performed (No in S201), the control unit 13 obtains the minimum window length remainder from the parallelization window management table 124 (S202).

After that, the control unit 13 determines whether the number of events (the number of input events) stored in the parallelization window 121 already reaches the parallelization window length stored in the parallelization window management table 124 (S203). When the number of input events does not reach the parallelization window length (No in S203), the processing of FIGS. 13A and 13B end.

When the number of input events already reaches the parallelization window length (Yes in S203), the control unit 13 locks the parallelization window 121 (S204). After that, the synchronization unit 14 transits a reach notification including a reach time to the other processing servers 10 (S205). After that, the control unit 13 waits for reception of state information (parallelization window length, the number of input events) from each of all of the processing servers 10 that are transmission destinations of the reach notification (S206). However, when a reach notification in which the reach time is earlier is received from a further processing server 10 during the standby (Yes in S207), the processing of FIGS. 13A and 13B end.

In addition, when state information on each of the processing servers 10 that are transmission destinations of the reach notification is received from the processing server 10 (Yes in S206), the control unit 13 calculates the total number of input events and the whole window length remainder (S208). The calculated total number of input events is stored in the window management table 123.

After that, the control unit 13 determines whether the total number of input events is the whole window length or more, which is stored in the window management table 123 (S209). When the total number of input events is less than the whole window length (No in S209), the control unit 13 determines whether the whole window length remainder is less than the minimum window length remainder (S210). The initial value of the minimum window length remainder may be, for example, 0. When the whole window length remainder is less than the minimum window length remainder (Yes in S210), processing for switching to centralized counting is executed (S221). The detail of the processing for switching to centralized counting is described later.

When the whole window length remainder is the minimum window length remainder or more (No in S210), the control unit 13 of each of the processing servers 10 calculates a new parallelization window length (S211). For example, the parallelization window length of each of the processing servers 10 is calculated so that the whole window length remainder is distributed substantially evenly. The newly-calculated parallelization window length is stored in the parallelization window management table 124.

After that, the synchronization unit 14 notifies each of the processing servers 10 of the new parallelization window length (S212). After that, the synchronization unit 14 receives state information of the parallelization window 121 in each of the processing servers 10 that are the transmission destinations of the new parallelization window length. The state information is transmitted from the processing server 10 (S213). Here, state information is received after events input to each of the processing servers 10 and stored in the buffer 122 from Steps S205 to S212 are reflected on the parallelization window 121 of the processing server.

After that, the control unit 13 calculates the total number of input events and the whole window length remainder based on the newly-received state information (S214). The calculated total number of input events is stored in the window management table 123. After that, the control unit 13 releases the lock of the parallelization window 121 (S215).

After that, the control unit 13 determines whether the total number of input events is the whole window length or more, which is stored in the window management table 123 (S216). When the total number of input events is less than the whole window length (No in S21), the control unit 13 determines whether the whole window length remainder is less than the minimum window length remainder (S217). When the whole window length remainder is the minimum window length remainder or more, the processing of FIGS. 13A and 13B end. When the whole window length remainder is less than the minimum window length remainder (Yes in S217), the processing for switching to centralized counting is executed (S221).

In addition, in Step S209 or Step S216, in a case in which the total number of input events is the whole window length or more (Yes in S209 or S216), when the total number of input events exceeds the whole window length (Yes in S218), the control unit 13 stores the whole window length remainder calculated in Step S208 in the window management table 123 as the minimum window length remainder (S219). That is, the minimum window length remainder is updated. After that, firing processing is executed (S220). The detail of the firing processing is described later.

Figure 14:
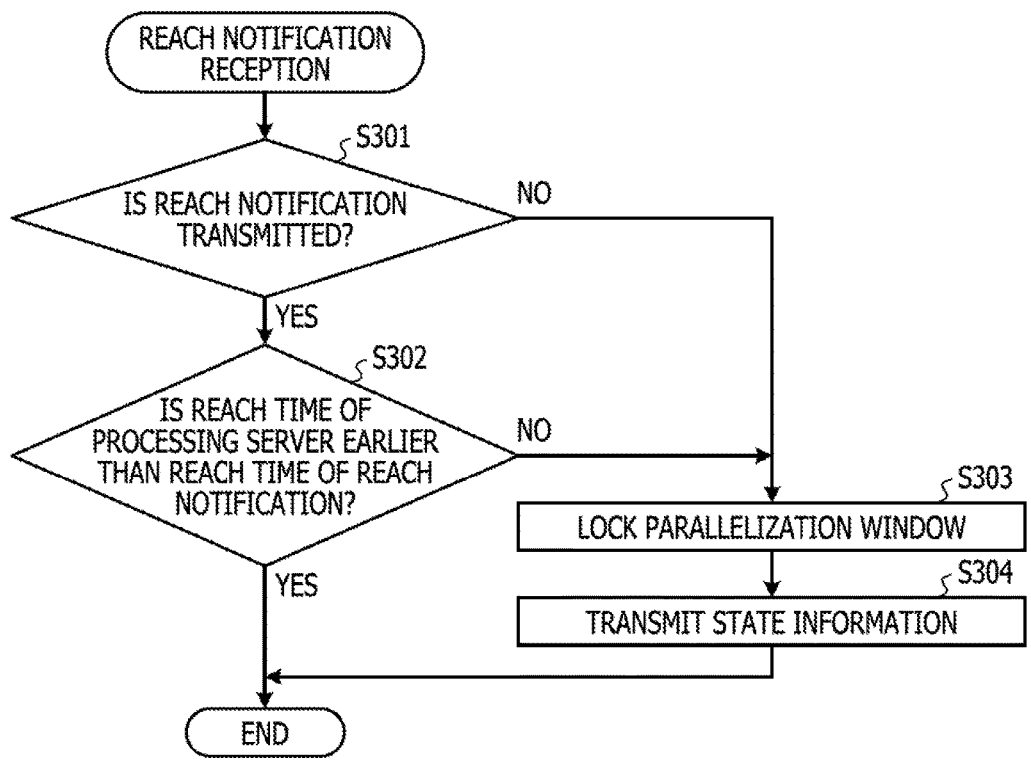
FIG. 14 is a flowchart illustrating an example of a processing procedure executed by the processing server in response to reception of a reach notification.

A processing procedure executed by a processing server 10 on the reception side of a reach notification transmitted in Step S205 is described later. FIG. 14 is a flowchart illustrating an example of a processing procedure executed by the processing server in response to reception of a reach notification.

When a reach notification transmitted from a further processing server 10 is received, the control unit 13 determines whether the processing server 10 already transmits a reach notification before reception of the reach notification (S301). When the processing server 10 already transmits a reach notification (Yes in S301), the control unit 13 determines whether the reach time of the processing server 10 is earlier than the reach time included in the received reach notification (S302). When the reach time of the processing server 10 is earlier than the reach time included in the received reach notification (Yes in S302), the processing of FIG. 14 ends. That is, in this case, transmission of the state information is not performed.

In addition, when the processing server 10 is yet to transmit a reach notification (No in S301), or when the reach time of the processing server 10 is later than the reach time included in the received reach notification (No in S302), the control unit 13 locks the parallelization window 121 (S303). After that, the control unit 13 transmits the state information of the parallelization window 121 (parallelization window length, the number of input events) to the processing server 10 that is a transmission source of the reach notification (S304).

A processing procedure executed by a processing server 10 on the reception side of a parallelization window length transmitted in Step S212 of FIGS. 13A and 13B are described below.

Figure 15:
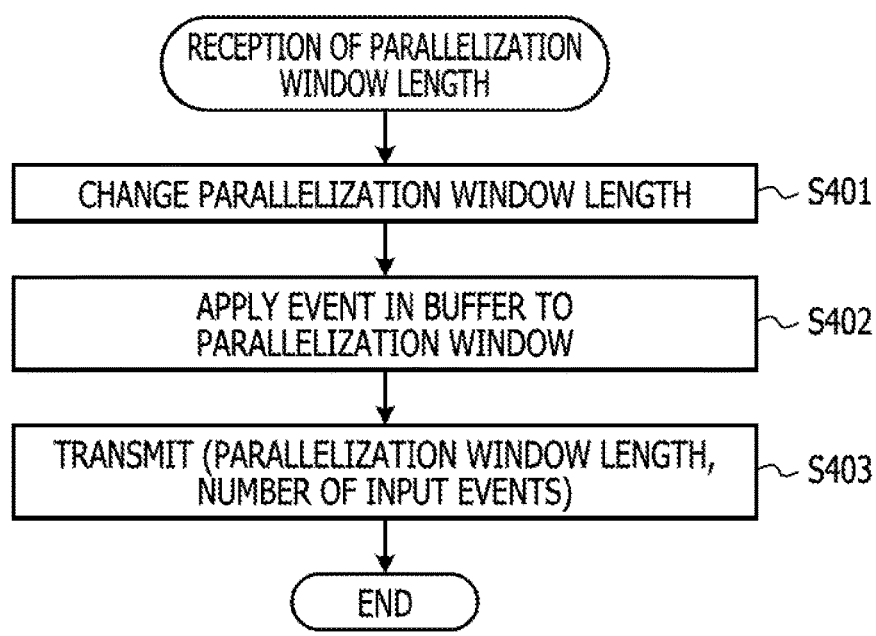
FIG. 15 is a flowchart illustrating an example of a processing procedure executed by the processing server in response to reception of a parallelization window length.

FIG. 15 is a flowchart illustrating an example of a processing procedure executed by the processing server in response to reception of a parallelization window length.

When a parallelization window length is received, the control unit 13 changes the value of the parallelization window length of the parallelization window management table 124 to the received parallelization window length (S401). After that, the control unit 13 applies an event stored in the buffer 122 to the parallelization window 121 (S402). The synchronization unit 14 transmits the number of input events and the parallelization window length after the change to the processing server 10 that is the transmission source of the parallelization window length (S403).

Figure 16:
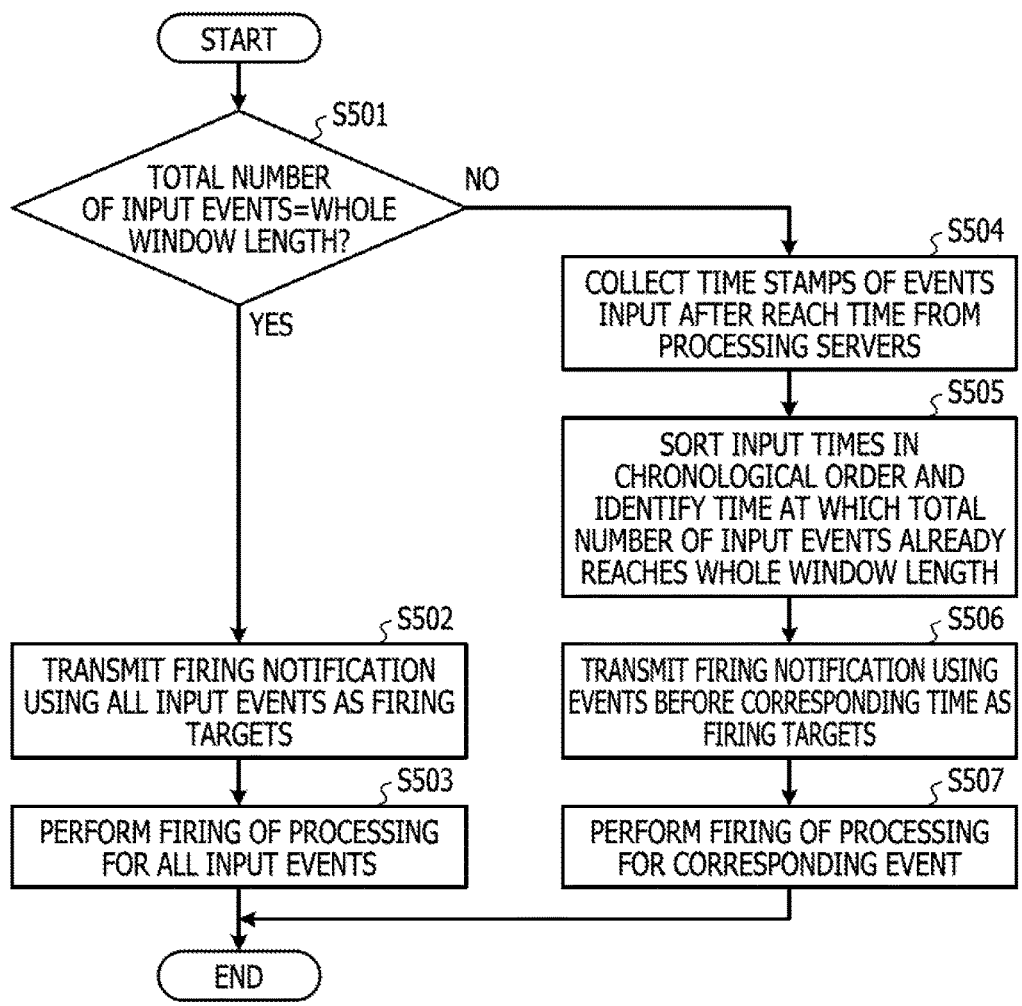
FIG. 16 is a flowchart illustrating an example of a processing procedure of firing processing.

The detail of Step 220 of FIGS. 13A and 13B are described below. FIG. 16 is a flowchart illustrating an example of a processing procedure of the firing processing.

In Step S501, the control unit 13 determines whether the total number of input events is matched with the whole window length. When the total number of input events is matched with the whole window length (Yes in S501), the synchronization unit 14 transmits a firing notification indicating that all input events are firing targets, to the other processing servers 10 (S502). After that, the processing unit 12 executes the complex event processing for all of the events stored in the parallelization window 121 (S503).

In addition, when the total number of input events is larger than the whole window length (No in S501), the synchronization unit 14 collects lists of input times of events input after the reach time, from the other processing servers 10 (S504).

After that, the control unit 13 sorts the input times of the events input after the reach time from among events stored in the parallelization window 121 of the processing server 10 and input times collected from the other processing servers 10, in chronological order, and identifies the last time included in the whole window length in the sort order (S505). That is, a time at which the total number of input events already reaches the whole window length is identified. As a result, information used to define a range of events that are firing targets is obtained.

After that, the synchronization unit 14 transmits a firing notification including the identified time to the other processing servers 10 (S506). After that, the processing unit 12 executes the complex event processing for the events input before the identified time, from among the events stored in the parallelization window 121 (S507).

Figure 17:
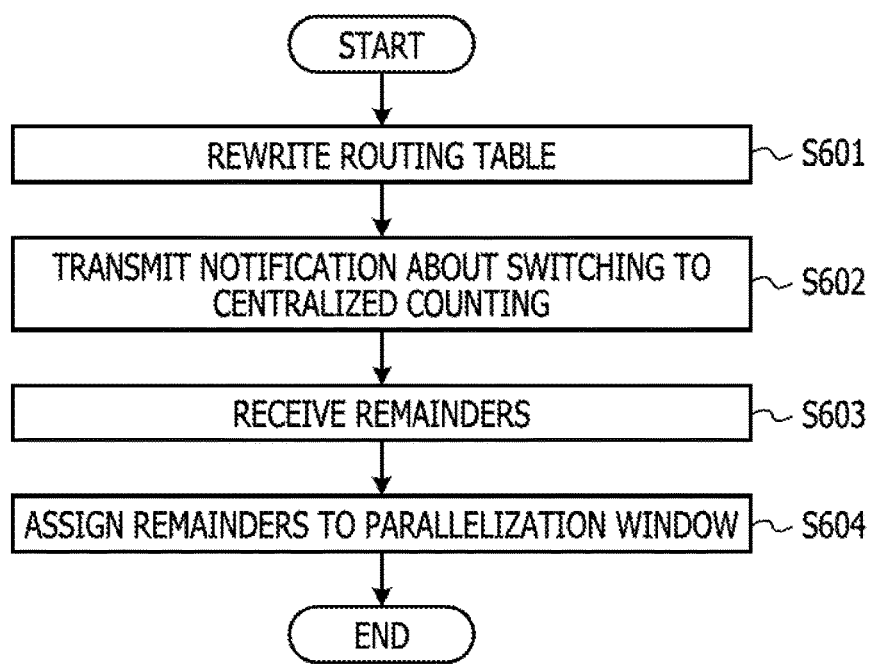
FIG. 17 is a flowchart illustrating an example of a processing procedure of processing for switching to centralized counting.

The detail of Step S221 of FIGS. 13A and 13B are described below. FIG. 17 is a flowchart illustrating an example of a processing procedure of the processing for switching to centralized counting.

In Step S601, the transfer unit 11 rewrites the routing table 125. That is, a destination of an event destined for a further processing server 10 is rewritten as the processing server 10.

After that, the synchronization unit 14 transmits a notification about switching to centralized counting, to the other processing servers 10 (S602). As a result, even in the other processing servers 10, the routing table 125 is rewritten. In addition, the parallelization window lengths of the other processing servers 10 are updated to values in each of which the parallelization window length remainder becomes 0. After that, the synchronization unit 14 receives the parallelization window length remainders before the update from the other processing servers 10 (S603). After that, the control unit 13 assigns a total of the received parallelization window length remainders to the parallelization window length of the parallelization window 121 (S604). Specifically, the total of the received parallelization window length remainders is added to the value of the parallelization window length remainder in the parallelization window management table 124.

As described above, in the embodiment, the frequency of synchronization between the processing servers 10 is changed depending on a possibility in which the total number of input events already reaches the whole window length. Specifically, the frequency of the synchronization becomes high as the possibility become high. As a result, the accuracy of timing at which the complex event processing executed each time the specific number of events are input is parallel-distributed may be secured.

In addition, when the frequency of the synchronization is changed, the frequency of the synchronization may be reduced as compared with a case in which the synchronization is performed each time an event is input to each of the processing servers 10. As a result, a reduction in the processing performance by each of the processing servers 10 may be suppressed.

For example, it is assumed that parallelization of a window of "window length=N" is performed for M processing servers 10. In a case in which the embodiment is not applied, when the accuracy of the firing timing is maintained, it is desirable to perform communication N×M times in order to check the states of all of the processing servers 10 each time one event is input. In addition, when the cycle of the synchronization is set at one second intervals in order to maintain the performance, firing delay by one second occurs at maximum.

In addition, in the embodiment, the synchronization is not performed until the number of input events in any one of the processing servers 10 reaches the parallelization window length, so that it is only sufficient to perform communication once while the performance is maintained when events are evenly input to the parallelization windows.

As described above, in the embodiment, parallel distribution of "length window" may be achieved while the accuracy of firing timing and the performance are maintained.

As an attribute of the window, there is a slide width (length) in addition to the window length. The slide width is a unit used to perform counting in the window length. For example, in a case of a window in which "window length=100" and "slide width=10" are satisfied, firing occurs when 10 events are input. In the embodiment, the description is made above on the premise that "window length=slide width" is satisfied, but in a case in which "window length<slide width" is satisfied, the slide width is replaced with the whole window length to implement the embodiment.

In the embodiment, the processing server 10 is an example of an information processing device. The synchronization unit 14 is an example of an obtaining unit. The control unit 13 is an example of an update unit.

The embodiments of the technology discussed herein are described above in detail, but the technology discussed herein is not limited to such specific embodiments, and various modifications and changes may be made within the scope of the gist of the technology discussed herein described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-implemented method:
the computer-implemented method to process a plurality of input events in parallel among a plurality of computers comprising:
receiving the plurality of input events by the plurality of computers, the plurality of computers having a plurality of parallelization window lengths specifying an allocation amount available to receive the plurality of input events; and
processing the plurality of input events, the processing includes:
when a processing computer of the plurality of computers has received a number of input events corresponding to a parallelization window length of the processing computer:
obtaining a state of each of the plurality of computers, wherein the state indicating a window length remainder of each of the plurality of computers;
in response to the obtaining the state of the each of the plurality of computers, calculating a whole window length remainder based on the state of each of the plurality of computers; and
in response to the calculating the whole window length remainder based on the state of each of the plurality of computers, updating the parallelization window length of at least one of the plurality of computers based on the whole window length remainder.

2. The computer-implemented method according to claim 1, wherein the updating is performed when the whole window length remainder is greater than a window length remainder threshold.

3. The computer-implemented method according to claim 1, wherein the whole window length remainder is calculated by subtracting a total number of input events from a whole window length, the whole window length corresponds to the number of input events to be received by the plurality of computers to start the processing of the plurality of the input events for the complex event, and the processing further includes adjusting a frequency of synchronization of the plurality of computers within the whole window length based on the total number of input events and the whole window length.

4. The computer-implemented method according to claim 3, wherein the processing further includes
starting the processing of the plurality of the input events at a firing timing, the firing timing corresponding to when the total number of input events is equal to the whole window length.

5. The computer-implemented method according to claim 4, wherein the processing further includes
comparing the total number of input events with the whole window length;
acquiring an input event time for each input event received after the total number of input events equals the whole window length when the comparing indicates the total number of input events is greater than the whole window length,
sorting the acquired input event times in a chronological order; and
identifying the firing time from the sorted input event times.

6. The computer-implemented method according to claim 1, wherein the processing further includes
determining, by the processing computer, a reach notification indicating that the number of input events received by the processing computer has reached the parallelization window length of the processing computer; and
transmitting the reach notification to another computer to request a state of the another computer.

7. The computer-implemented method according to claim 6, wherein the processing further includes
receiving a different reach notification from the another computer after transmitting the reach notification and before obtaining the state of each of the plurality of computers; and
performing arbitration between the plurality of computers based on the reach notifications to determine which computer of the plurality of computers will be the processing computer.

8. The computer-implemented method according to claim 1, wherein parallelization windows of the plurality of computers are locked during the processing, input events received while the parallelization windows are locked are buffered, and the processing is repeated in consideration of the buffered input events before the parallelization windows are unlocked.

9. The computer-implemented method according to claim 1, wherein the processing further includes
comparing the whole window length remainder with a window length remainder threshold; and
switching from parallel counting the plurality of input events using the plurality of computers to centralized counting using the processing computer when the window length remainder is less than the window length remainder threshold.

10. An information processing device:
the information processing device performs complex event processing in parallel with at least one other information processing device, the information processing device comprising:
a memory; and
a processor coupled to the memory and configured to:
when a number of input events corresponding to a parallelization window length of the information processing device are received:
obtain a state of the at least one other information processing device, the state indicating a window length remainder of each of the at least one other processing device, the parallelization window length specifies an allocation amount available to receive input events of a complex event;
in response to the obtaining the state of the at least one other information processing device, calculating a whole window length remainder based on the state of the at least one other information processing device; and
in response to the calculating the whole window length remainder, outputting an instruction causing an update of the parallelization window length of the at least one other information processing device based on the whole window length remainder.

11. A non-transitory computer-readable storage medium storing a complex event processing program:
execution of the complex event processing program, by a processor of an information processing device, causes the information processing device to perform a process comprising:
when a number of first inputs indicating a number of inputs of the events to the information processing device reaches a specific range for the allocation amount to the information processing device:
obtaining, from another information processing device of a plurality of other information processing devices configured to process a complex event with the information processing device in parallel, a number of second inputs indicating a number of inputs of the events to the the another information processing device; and
in response to the obtaining the number of second inputs, updating the allocation amount to the information processing device and the allocation amount to the another information processing device based on a difference between a total of the number of first inputs and the number of second inputs, and a specific number of the events processed in parallel.

12. The non-transitory computer-readable storage medium according to claim 11, wherein the process further comprises:
obtaining the number of second inputs again after the updating of the allocation amount to the first information processing device and the allocation amount to the second information processing device;
storing the difference in a memory when a total of the number of first inputs and the number of second inputs obtained again exceeds the specific number; and
determining that counting of the number of inputs of the events is centralized when a difference between the specific number and a total of the number of first inputs and the number of second inputs obtained in the obtaining and when the number of first inputs after the difference is stored in the memory reaches the specific range for the allocation amount to the first information processing device is less than the difference stored in the memory.

13. The non-transitory computer-readable storage medium according to claim 12, wherein
the process further comprises:

sorting the events input to the first information processing device and the second information processing device based on the respective input times and notifying the second information processing device of information indicating the events included in the specific number after the sorting, when the total of the number of first inputs and the number of second inputs obtained again exceeds the specific number.

14. An information processing device:
the information processing device performs complex event processing, the information processing device comprising:
   a memory; and
   a processor coupled to the memory and configured to:
      when a number of first inputs indicating a number of inputs of the events to the information processing device reaches a specific range for the allocation amount to the information processing device:

obtain, from another information processing device of a plurality of other information processing devices configured to process a complex event with the information processing device in parallel, a number of second inputs indicating a number of inputs of the events to the second information processing device; and in response to the obtaining the number of second inputs, update the allocation amount to the information processing device and the allocation amount to the another information processing device based on a difference between a total of the number of first inputs and the number of second inputs, and a specific number of the events processed in parallel.

* * * * *